United States Patent
Boehm et al.

[15] 3,688,856
[45] Sept. 5, 1972

[54] DUAL PURPOSE SNOWMOBILE HOOD

[72] Inventors: Kurt B. Boehm, Lake Bluff, Ill.; Leslie W. Foster, Wayzata; Ole E. Tweet, Roseau, both of Minn.

[73] Assignee: Textron Inc., 2, Providence, R.I.

[22] Filed: Dec. 14, 1970

[21] Appl. No.: 97,610

[52] U.S. Cl. ............... 180/5, 296/31 P, 180/69 C
[51] Int. Cl. ............................................. B62m 27/00
[58] Field of Search ....... 296/31 P; 180/5, 69 R, 69 C

[56] References Cited

UNITED STATES PATENTS

| | | | |
|---|---|---|---|
| 1,365,837 | 1/1921 | Leverett | 180/69 C |
| 2,834,419 | 5/1958 | Sebok | 180/54 A |
| 3,338,326 | 8/1967 | Hafer | 180/69 C |

OTHER PUBLICATIONS

Johnson Skee-Horse Snowmobiles for '68 (Note Top of Page 2.)

*Primary Examiner*—Gerald M. Forlenza
*Assistant Examiner*—John Mannix
*Attorney*—Merchant & Gould

[57] ABSTRACT

A snowmobile is shown having a forward compartment in which an engine is mounted. A protective and decorative hood is provided for the compartment. An open access door is formed in a top wall of the hood above the engine to provide cooling air flow to the engine when open. A fitted access panel is removably secured in the access door to protect and cover the engine when closed.

2 Claims, 3 Drawing Figures

PATENTED SEP 5 1972 3,688,856
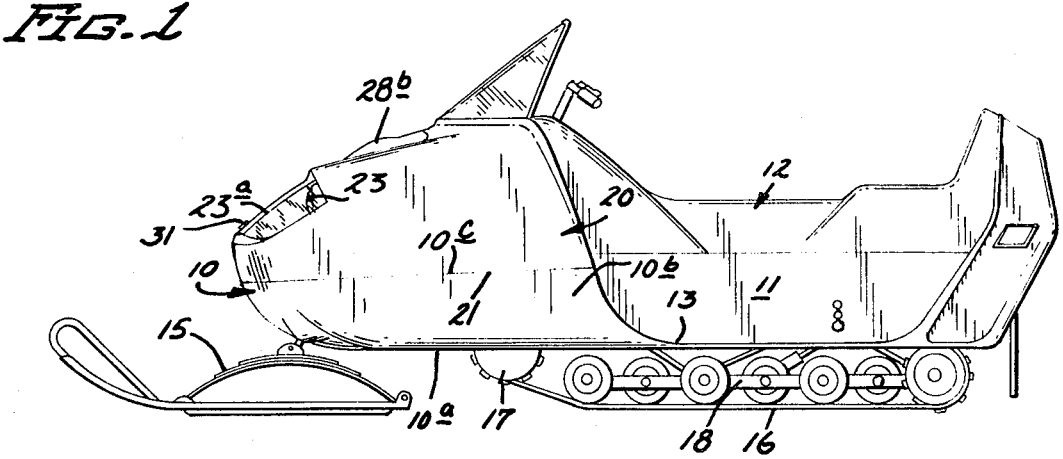
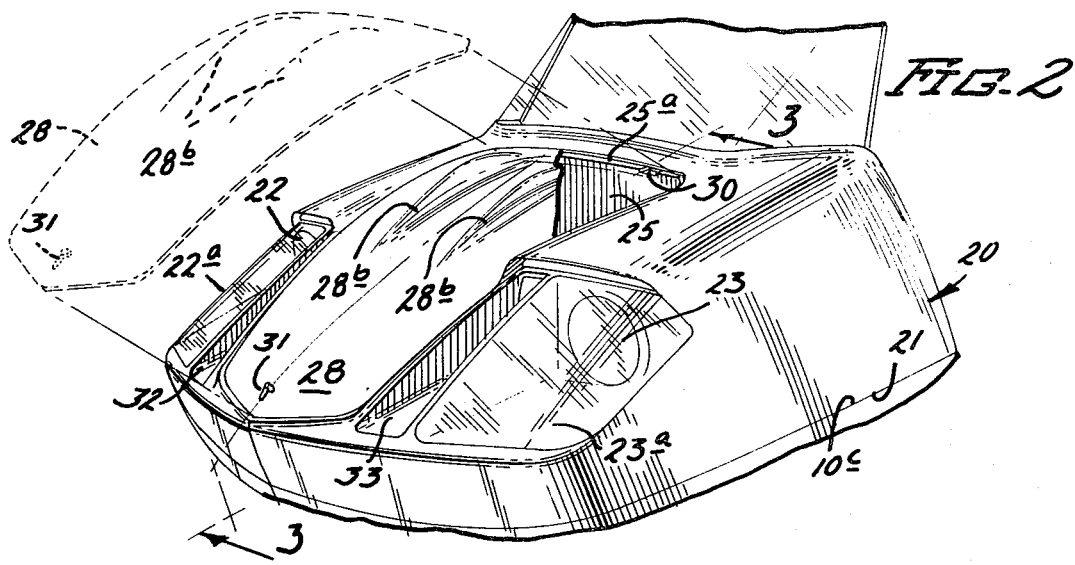
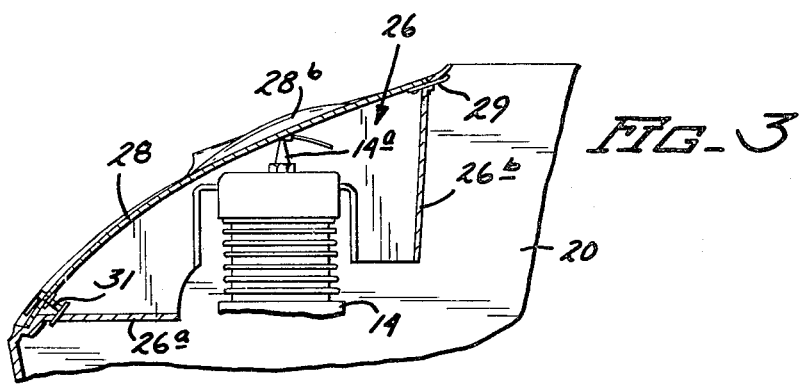
INVENTORS.
KURT B. BOEHM
LESLIE W. FOSTER
OLE E. TWEET
BY Merchant & Gould
ATTORNEYS

DUAL PURPOSE SNOWMOBILE HOOD

BACKGROUND OF THE INVENTION

1. Field of the Invention

This invention relates generally to snowmobile hood constructions and more particularly relates to a free air snowmobile hood having a fitted panel that can be mounted in the free air opening of the hood.

2. Description of the Prior Art

The term "snowmobile" when used herein means a vehicle having an elongated frame with ski steering means mounted on the forward end thereof and endless drive track means mounted at the rear end thereof to provide the sole support for the rear of the vehicle. The frame defines a forward compartment in which the engine and other components connecting the engine to the drive track are mounted. A typical prior art snowmobile as shown, for example, in the A. E. Hetteen U.S. Pat. No. 3,527,505 that issued Sept. 8, 1970 has a forwardly located protective and decorative hood that mounts over the engine compartment to cover and protect the engine and other drive train components. The snowmobile hood shown in the Hetteen prior art patent forms a complete cover for the engine compartment but louvers and other like openings are normally provided in the hood to permit air flow over the engine. Most snowmobiles of the type shown in the Hetteen patent have fans operated by the engine that draw or blow air over the cylinders for cooling purposes.

As recently as two or three years ago, the free air hood was designed and placed in commercial production. In the free air hood, an opening is provided in the top wall of the hood above the engine. Typically, the cylinder heads and spark plugs of the engine extend into or through this opening so that full air flow over the engine cylinders and heads is achieved whenever the snowmobile is moving. The snowmobiles manufactured by applicants' assignee have two cycle engines that are notoriously hard on spark plugs. The free air hood has provided additional cooling for the engine and spark plugs so that replacement time is extended. Initially, the free air hood was used with racing machines to obtain better performance with less vehicle weight. Recently, however, more consumers have demanded the free air type of machine.

Other consumers have desired to stay with the standard hood that provides a complete cover for the engine. The standard hood like that shown in the Hetteen patent better protects the engine and keeps it cleaner and drier. Because of these different consumer demands, it has been necessary in the prior art to manufacture two different hoods, one closed type and one free air type for each snowmobile model. This in turn required a different set of molds and dies for each hood.

SUMMARY OF THE INVENTION

The present invention provides a single snowmobile hood design that can serve as either a free air hood or like a standard closed hood. An open access door is formed in a top wall of the hood above the engine to provide free air flow to the engine when open. A removable access panel sized to fit into and cover the access door is also provided. A single set of molds and dies can be used to manufacture all hoods for a single model. The manufacturer is given the choice of selling the machines with or without the access door. The consumer purchasing a machine with an access door is given the option of using the machine with or without the panel.

BRIEF DESCRIPTION OF THE DRAWINGS

FIG. 1 is a view in side elevation of a snowmobile incorporating the dual purpose hood of this invention;

FIG. 2 is an enlarged fragmentary view in perspective of the nose portion of the snowmobile with the removable access panel being exploded therefrom and shown in phantom; and FIG. 3 is a fragmentary vertical sectional view of the hood and a portion of the engine taken along line 3—3 of Figure 2.

DESCRIPTION OF THE PREFERRED EMBODIMENT

Referring now to the drawings, wherein like reference numerals are used throughout the several views to indicate like elements of the invention, there is disclosed in Fig. 1 a snowmobile having an elongated frame defining a forwardly located engine compartment 10 and an inverted, generally U-shaped rear portion 11. A seating portion 12 is carried by the rear portion 11, and footrest member 13 extends outwardly from each side of the bottom edge of rear portion 11. Engine compartment 10 has a bottom pan portion 10a and upturned side walls 10b terminating in a peripheral edge 10c lying in a generally horizontal plane. The peripheral edge 10c thus defines an open top for the engine compartment 10. As shown in Fig. 3, an engine 14 is mounted in compartment 10 above the bottom pan portion 10a and extends upwardly through the top of the compartment above the plane of peripheral edge 10c.

The snowmobile shown in the drawings also includes a pair of steerable skis 15, one of which is shown in Fig. 1, mounted through and beneath bottom pan portion 10a. Mounted beneath and partially within the confines of the inverted, generally U-shaped rear portion 11 is an endless drive track 16 driven by a drive sprocket wheel 17 mounted on frame 11. Track 16 is supported by a wheel-type suspension system 18 secured beneath the generally U-shaped rear portion 11.

A suspension system of this kind is more fully shown and described in the co-pending Donnelly L. Hetteen U.S. Pat. application Ser. No. 844,316, filed July 24, 1969, assigned to the same assignee as the present application.

The snowmobile shown in the drawings is provided with a protective and decorative hood 20 having a bottom peripheral edge 21 that is secured to the peripheral edge 10c of compartment 10. Hood 20 is normally molded from a plastic material such as fiber glass or polycarbonate. It could, of course, be molded from a metal as well. Hood 20 is normally removably secured to engine compartment 10 so that the operator can quickly remove the entire hood to work on the engine or other drive components. However the connection between hood 20 and compartment 10 forms no part of the present invention and is not shown herein.

Hood 20 has a pair of spaced headlights 22 and 23 mounted in formed recesses on opposite sides thereof.

Clear plastic covers 22a and 23a are mounted over the recesses to protect the headlights and prevent snow or other foreign materials from lodging in the recesses.

Formed between the two headlights 22 and 23 in a top wall of hood 20 is an open access door 25. In the preferred embodiment of our invention, access door 25 extends nearly the full longitudinal length of the hood 20 and is sufficiently wide to extend on both sides of the engine 14. As shown in Fig. 3, hood 20 is formed to have a interior shroud 26 secured to the peripheral edge of access door 25. Shroud 26 has a generally horizontally extending front portion 26a and generally sloping side and rear walls 26b. An opening 27 is formed in the center of shroud 26 to accommodate the upwardly extending head and cylinders of engine 14. Shroud 26 is designed so that when the vehicle is moving and door 25 is open, air will be channeled by the upper surface of shroud 26 directly over the hottest portions of engine 14 and thence upwardly over hood 20 and a windshield 27. Shroud 26 thus provides a flow path for the air so as to achieve maximum cooling and also acts to prevent extraneous materials such as snow from entering the engine compartment.

Open access door 25 is provided with a recessed flange 25a around its periphery that serves to support a removable access panel 28 that is sized to fit into and cover access door 25. Panel 28 is provided at its rear edge with one or more tabs 29 that extend into correspondingly positioned slots 30 formed along the rear edge of door 25 to hold the rear end of the panel in the door. The front end of panel 28 is provided with a rotatable hook member 31 that is engageable with hood 20 to securely hold panel 28 in the opening 25.

In the preferred embodiment of our invention, the spark plugs 14a of engine 14 extend slightly through the opening 25 so that a pair of upwardly extending indentations 28a and 28b are formed in the access panel 28 to accommodate spark plugs 42a.

In order to provide air flow for cooling the engine when panel 28 is locked in pace, a pair of air flow openings 32 and 33 are formed in hood 20 between opening 25 and the recesses for headlights 22 and 23. Additional openings or louvers could also be provided if more cooling air were required.

By means of the present invention, a snowmobile manufacturer can utilize a single set of molds and dies to manufacture a snowmobile hood that can be sold either with or without access panel. For high performance machines, the snowmobile might be sold without a panel. Other consumers would desire to purchase machines having the removable access panel so that they could use the machine either with or without the panel. Our invention is defined in the appended claims.

What is claimed is:

1. A snowmobile, comprising:
a. an elongated frame with ski steering means mounted on the forward end thereof and endless drive track means mounted at the rear end thereof to provide the sole support for the rear of the snowmobile;
b. said frame having a forwardly located engine compartment having a bottom pan portion and upturned side walls terminating in a peripheral edge lying in a generally horizontal plane and defining an open top;
c. an engine mounted in said compartment above said bottom pan portion and extending upwardly through said open top above said plane of said edge;
d. a protective and decorative hood removably mounted on said peripheral edge and covering said compartment, said hood having a pair of spaced headlights mounted therein on opposite sides thereof and an open access door formed in a top wall thereof between said headlights and above said engine to provide cooling air flow for said engine when open;
e. an access panel sized to fit into and cover said access door;
f. releaseable locking means for removably securing said access panel in said access door, said access panel being completely removeable from said access door to permit free flow of cooling air over said engine; and
g. interior shroud means secured to said hood around said access door, said shroud means having an opening therein through which said engine extends.

2. A snowmobile comprising:
a. an elongated frame with ski steering means mounted on the forward end thereof and endless drive track means mounted at the rear end thereof;
b. said frame having a forwardly located engine compartment;
c. an engine mounted in said compartment;
d. a protective and decorative hood removably mounted on and covering said compartment, said hood having an open access door formed in a top wall thereof in line with said engine to provide cooling air flow for said engine when open;
e. a removable protective and decorative access panel for said access door;
f. means for removably securing said access panel in said access door to protect and cover said engine; and
g. a shroud permanently secured to said hood around said door and extending inwardly toward said compartment, said shroud having an opening therein through which said engine extends and being formed to provide an air flow path around said engine and to partially prevent extraneous materials from entering said compartment.

* * * * *